US012613008B2

(12) United States Patent
Korjani et al.

(10) Patent No.: US 12,613,008 B2
(45) Date of Patent: Apr. 28, 2026

(54) MACHINE LEARNING SYSTEM FOR STORAGE VESSEL FILL LEVEL DETECTION

(71) Applicant: Clean Connect AI, Inc., Windsor, CO (US)

(72) Inventors: Mehdi Korjani, Pasadena, CA (US); Elnaz E. Ramezani, Los Angeles, CA (US); David A. Conley, Windsor, CO (US); Mark H. Smith, Gilbert, AZ (US)

(73) Assignee: Clean Connect AI, Inc., Windsor, CO (US)

( * ) Notice: Subject to any disclaimer, the term of this patent is extended or adjusted under 35 U.S.C. 154(b) by 287 days.

(21) Appl. No.: 18/455,724

(22) Filed: Aug. 25, 2023

(65) Prior Publication Data

US 2025/0067400 A1 Feb. 27, 2025

(51) Int. Cl.
*F17C 13/02* (2006.01)

(52) U.S. Cl.
CPC .................................. *F17C 13/026* (2013.01)

(58) Field of Classification Search
CPC ..................................................... F17C 13/026
See application file for complete search history.

(56) References Cited

U.S. PATENT DOCUMENTS

| | | | | |
|---|---|---|---|---|
| 9,932,944 | B2 | 4/2018 | Yang et al. | |
| 10,068,467 | B1 | 9/2018 | Pennebaker | |
| 10,577,912 | B2 * | 3/2020 | Torrione | G05B 15/02 |
| 10,745,263 | B2 | 8/2020 | Crouse et al. | |
| 11,674,839 | B1 * | 6/2023 | Spears | G01F 23/292 348/164 |
| 2017/0227457 | A1 * | 8/2017 | Zakrzewski | G01F 23/804 |
| 2019/0180464 | A1 | 6/2019 | Kraft et al. | |
| 2021/0123784 | A1 * | 4/2021 | Schwach | G01J 5/0037 |

FOREIGN PATENT DOCUMENTS

WO WO-2023028337 A1 * 3/2023 ............ E21B 44/00

OTHER PUBLICATIONS

International Search Report & Written Opinion for PCT/US2024/043670, mailed Nov. 27, 2024; 13 pages.

* cited by examiner

*Primary Examiner* — Jamel E Williams

(57) ABSTRACT

Various embodiments of the present technology relate to systems and methods to determine fill levels in a fuel extraction and storage environment. In some examples, a system comprises a thermal imaging device, a machine learning interface, and a machine learning engine. The thermal imaging device generates a thermal image that depicts fuel storage equipment. The machine learning interface generates feature vectors based on the thermal image that depicts the fuel storage equipment and feeds the feature vectors to a machine learning engine. The machine learning engine ingests the feature vectors, generates a machine learning output that indicates a fill level for the fuel storage equipment based on the feature vectors, and transfers the machine learning output.

20 Claims, 13 Drawing Sheets

MACHINE LEARNING SYSTEM FOR STORAGE VESSEL FILL LEVEL DETECTION

TECHNICAL FIELD

Various embodiments of the present technology relate to petrochemical technologies, and more specifically, to detecting and classifying fill levels in fuel storage and transfer equipment.

BACKGROUND

Petrochemical extraction systems comprise machinery and equipment configured to extract petroleum, natural gas, and other types of petrochemicals for use in energy generation, heating, and chemical production applications. Petrochemical extraction systems comprise extraction equipment, transfer equipment, and storage equipment. The extraction equipment is configured to remove petrochemicals from subterranean reservoirs. Examples of extraction equipment include drilling rigs and hydraulic fracturing devices. The transfer equipment is configured to transport the extracted petrochemicals between different geographic locations. Examples of transfer equipment include pipelines and tanker trucks. The storage equipment is configured to store petrochemicals. Examples of storage equipment include bullet tanks and storage vessels. Operators often need to add or remove fuel from the storage equipment. Operators first need to determine how much fuel is held by the storage equipment to prevent overfilling and to determine when it is necessary to refill the storage equipment. Due to the corrosive nature of many petrochemicals, traditional pressure gauges cannot be used to track petrochemical levels in the storage equipment. The walls of the storage equipment are often opaque which prevents operators from visually inspecting the exterior of the storage equipment to determine the fill level.

Conventional methods to determine petrochemical storage levels involve the use of Guided Wave Radar (GWR). To measure fuel levels using GWR, an operator must open a port on the roof of the storage equipment and ping the surface of the petrochemicals with radar waves using a GWR device. The GWR device calculates the distance between the GWR device and the surface of the petrochemicals based on the time elapsed between emission and detection of the radar waves. The operator then subtracts this distance from the tank height to determine the height of the petrochemicals in the tank which can then be used to determine total volume of the petrochemicals. This process is time consuming and hazardous to the operator. Many petrochemicals are toxic and/or carcinogenic which forces operators to wear extensive personal protection equipment when taking GWR measurements. This equipment is uncomfortable and cumbersome. Moreover, harmful vapors are released when the storage equipment port is opened to take GWR measurements which can result in environmental damage and may violate governmental regulations.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. Some machine learning models comprise supervised learning models. A supervised machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of supervised learning machine learning algorithms is their ability to learn by example, rather than needing to be manually programmed to perform a task, especially when the tasks would require a near-impossible amount of programming to perform the operations in which they are used.

Unfortunately, petrochemical extraction systems do not efficiently determine fill levels in the petrochemical storage equipment. Moreover, petrochemical extraction systems do not effectively utilize machine learning systems when measuring storage equipment fill levels.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for petrochemical storage and transfer systems. Some embodiments comprise a method of operating a detection system to determine fill levels in a fuel extraction and storage environment. The method comprises generating feature vectors based on a thermal image that depicts fuel storage equipment. The method further comprises feeding the feature vectors to a machine learning engine. The method further comprises receiving a machine learning output that indicates a fill level for the fuel storage equipment. The method further comprises generating and transferring a notification based on the machine learning output.

Some embodiments comprise a detection system to determine fill levels in a fuel extraction and storage environment. The detection system comprises a thermal imaging device, a machine learning interface, and a machine learning engine. The thermal imaging device generates a thermal image that depicts fuel storage equipment. The machine learning interface generates feature vectors based on the thermal image that depicts the fuel storage equipment and feeds the feature vectors to a machine learning engine. The machine learning engine ingests the feature vectors, generates a machine learning output that indicates a fill level for the fuel storage equipment based on the feature vectors, and transfers the machine learning output.

Some embodiments comprise a non-transitory computer-readable medium stored thereon instructions to determine fill levels in a fuel extraction and storage environment. The instructions, in response to execution, cause a system comprising a processor to perform operations. The operations comprise generating feature vectors based on a thermal image that depicts a fuel storage equipment. The operations further comprise feeding the feature vectors to a machine learning engine. The operations further comprise receiving a machine learning output that indicates a fill level for the fuel storage equipment. The operations further comprise generating and transferring a notification based on the machine learning output.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
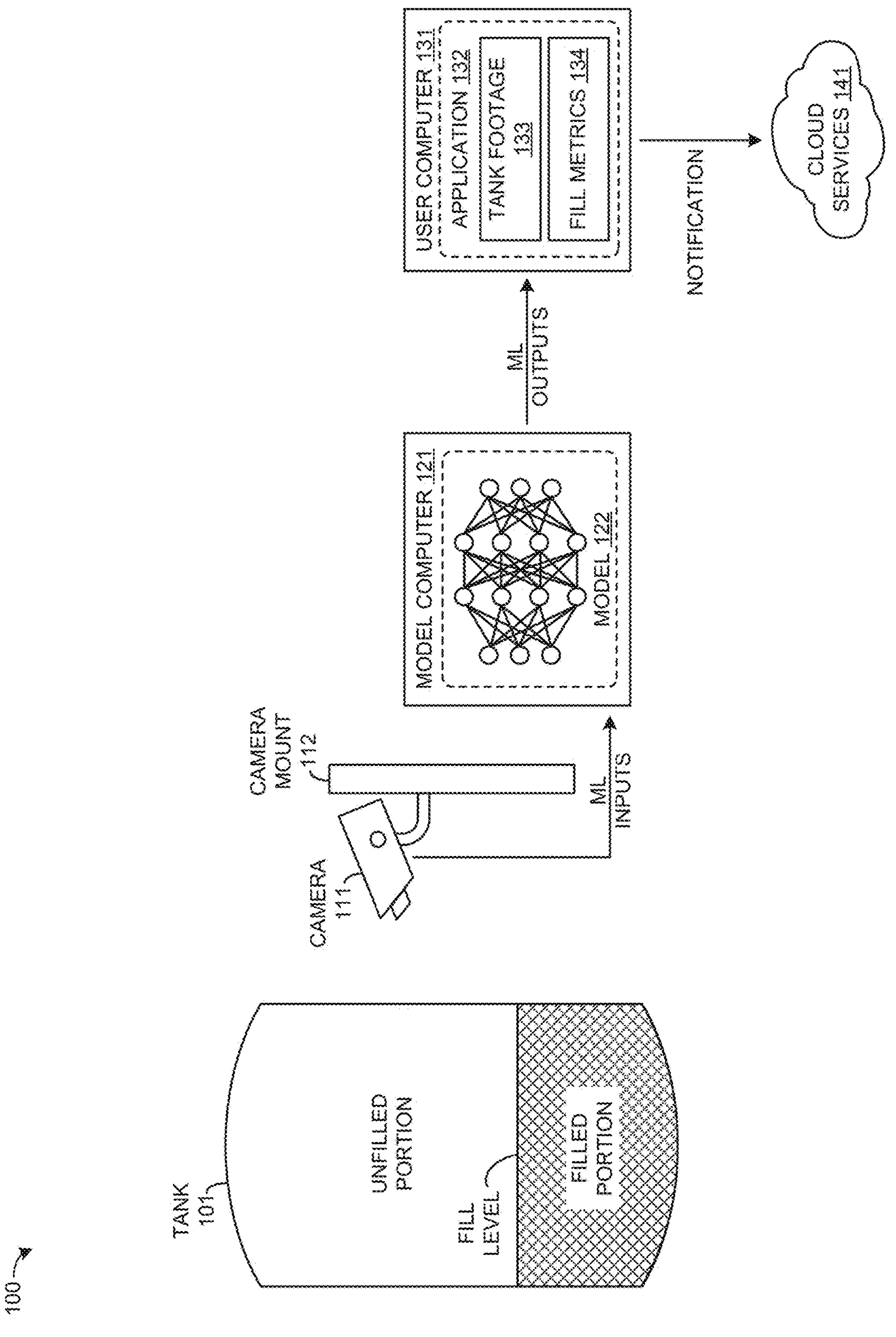
FIG. 1 illustrates an exemplary fill level detection system.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates environment 100 to detect fuel fill levels in petrochemical storage, transfer, and extraction equipment. Environment 100 performs services like petrochemical storage, petrochemical transfer, petrochemical extraction, petrochemical fill level detection, and petrochemical fill level notification. Environment 100 comprises tank 101, camera 111, camera mount 112, model computer 111, and user computer 121. Model computer 111 hosts model 112. User computer 121 hosts application 122 which comprises tank footage 133 and fill metrics 134. In other examples, environment 100 may include fewer or additional components than those illustrated in FIG. 1. Likewise, the illustrated components of environment 100 may include fewer or additional components, assets, or connections than shown. Although camera 111, model computer 111, and user computer 121 are illustrated as separate devices, two or more of camera 111, model computer 111, and user computer 121 may be integrated into a single computing apparatus.

Storage tank 101 is representative of a piece of fuel storage equipment. Exemplary fuel storage equipment includes bullet tanks, Liquified Natural Gas (LNG) storage tanks, gas-holders, petroleum storage tanks, petroleum storage vehicles, and/or other types of petrochemical storage systems. In some examples, environment 100 may comprise additional devices for fuel extraction and fuel transfer. For example, environment 100 may comprise hydraulic fracturing equipment, oil drilling equipment, pipeline equipment, filling pumps, tanker vehicles, and the like. As illustrated in FIG. 1, tank 101 is divided into a filled portion and an unfilled portion. The filled portion is representative of the fuel stored by tank 101 while the unfilled portion is representative of the remaining volume of tank 101. For example, tank 101 may be partially filled with a refined petroleum product. The fill level indicates the height of the fuel in tank 101 with respect to the total height of tank 101.

Camera 111 is representative of one or more imaging systems to view tank 101 and generate videos/images depicting tank 101. In this example, camera 111 generates infrared and/or optical images depicting tank 101, however in other examples, camera 111 may employ a different type of imaging technology. For example, camera 111 may instead comprise an ultraviolet imaging system. It should be understood that fuel storage tanks have opaque walls that obstruct the interior view of the tank. As such, camera 111 typically comprises imaging technology for generating images in non-visible spectrums (e.g., infrared). Although camera 111 is illustrated as a single imaging device, in some examples camera 111 may comprise multiple imaging devices. The multiple cameras of camera 111 may include a combination of optical, infrared, and/or laser cameras and imaging devices to enhance fill level detection. Camera 111 may also include distance metric devices like laser rangefinders to estimate the distance between tank 101 and camera 111 to enhance fill level detection. Camera 111 is mounted on camera mount 112. Although camera mount 112 is depicted as a pole, camera mount 112 may comprise a different type of mounting structure or camera 111 may use no mounting structure at all. Camera mount 112 may include a pan and tilt system that moves the camera in multiple directions and orientations to cover a wider range and stabilize the field of view. Camera mount 112 may comprise a controller to move camera 111 to pre-defined views and control the direction of camera 111 to provide a 360-degree field of view with camera 111. The controller of camera mount 112 may receive instructions (e.g., from model computer 121) and responsively position camera 111 to view tank 101 or other equipment (not illustrated) in environment 100. Camera 111 transfers its image data to model computer 121 as a machine learning (ML) input.

Model computer 121 is representative of one or more computing devices configured to receive video data from camera 111 to measure the fill level of tank 101. The one or more computing devices of model computer 121 host machine learning model 122. For example, computer 121 may comprise an application specific circuit configured to implement a machine learning model. Model computer 121 may additionally host interfacing applications to receive and preprocess the image data from camera 111 or other telemetry data characterizing tank 101 (e.g., pressure, size, etc.). The interfacing applications may vectorize the received data to configure the data for ingestion by model 122. Vectorization is a feature extraction process to numerically represent the received data. In some examples, computer 121 may generate feature vectors that represent individual pixels of the video data received from camera 111.

Machine learning model 122 comprises any machine learning model implemented within environment 100 as described herein to measure the fill level in tank 101. A machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can identify the fill level in tank 101. Model 122 may comprise algorithms to detect equipment, to identify fill levels based on the equipment thermal signatures, to detect false positive signatures like reflections or shadows, and/or other types of machine learning algorithms. Examples of machine learning algorithms that may be employed solely or in conjunction with one another include Three Dimensional (3D) deep leaning models, 3D convolutional neural networks, times series convolutional deep learning, transformers, multi-layer perceptron, long term short memory, and attention based deep learning model. Other exemplary machine learning algorithms include artificial neural networks, nearest neighbor methods, ensemble random forests, support vector machines, naïve bayes methods, linear regressions, or similar machine learning techniques or combinations thereof capable of predicting output based on input data. Machine learning model 122 may be deployed on premises in environment 100 (e.g., proximate to tank 101) or at a remote location in the cloud.

Machine learning model 122 is trained to determine the fill level in tank 101 using thermal imaging or video data generated by camera 111. For example, camera 111 may transfer the training video images to user computer 131. A user may then annotate image frames of the video to create a training data set. The user may also combine environment and equipment information in the training data set. The annotations classify or segment portions of the image frames. For example, the annotations may classify a portion of the images as storage tank 101, another portion of the images as background environment, and another portion of the image as the fill level in tank 101. User computer 131 transfers the training data to model computer 121 to train model 122. Computer 121 receives and vectorizes the training data. Model 122 ingests the training data and trains its constituent machine learning algorithms to detect fuel storage equipment and measure tank fill levels.

User computer 131 is representative of one or more computing devices configured to display application 132 via a Graphical User Interface (GUI). User computer 131 comprises one or more computing devices, display screens, touch screen devices, tablet devices, mobile user equipment, keyboards, and the like. User computer 131 is operatively coupled to model computer 121. User computer 131 may be deployed at a remote location, on premises in environment 100 (e.g., proximate to tank 101), or both. User computer 131 and model computer 121 may be located at different geographic locations. Alternatively, user computer 131 may be co-located with model computer 121. Application 132 comprises a user interface application to display footage of tank 101 (e.g., pictures and/or video), and metrics (e.g., fill height, fuel volume, distance to tank, etc.), and/or other visual/textual elements that characterize fill levels in environment 100 based on machine learning outputs generated by model 122. In this example, application 132 is illustrated comprising visual elements for tank footage 133 footage and fill metrics 134, however in other examples, application 132 may comprise different or additional visual elements. User computer 131 may send some or all of the model results to cloud service 141 to distribute tank fill level data for use cases including reporting, saving historical data, presentation, and/or combining with different models or databases.

Camera 111, model computer 121, user computer 131, and cloud services 141 communicate over various communication links using communication technologies like Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols. Camera 111, model computer 121, user computer 131, and cloud services 141 comprise microprocessors, software, memories, transceivers, bus circuitry, and the like. The microprocessors comprise Central Processing Units (CPUs), Graphical Processing Units (GPUs), Digital Signal Processors (DSPs), Application-Specific Integrated Circuits (ASICs), Field Programmable Gate Arrays (FPGAs), analog computing circuits, and/or the like. The memories comprise Random Access Memory (RAM), flash circuitry, Hard Disk Drives (HDDs), Solid State Drives (SSDs), Non-Volatile Memory Express (NVMe) SSDs, and/or the like. The memories store software like operating systems, user applications, networking applications, machine learning applications, and the like. The microprocessors retrieve the software from the memories and execute the software to drive the operation of environment 100 as described herein.

Figure 3:
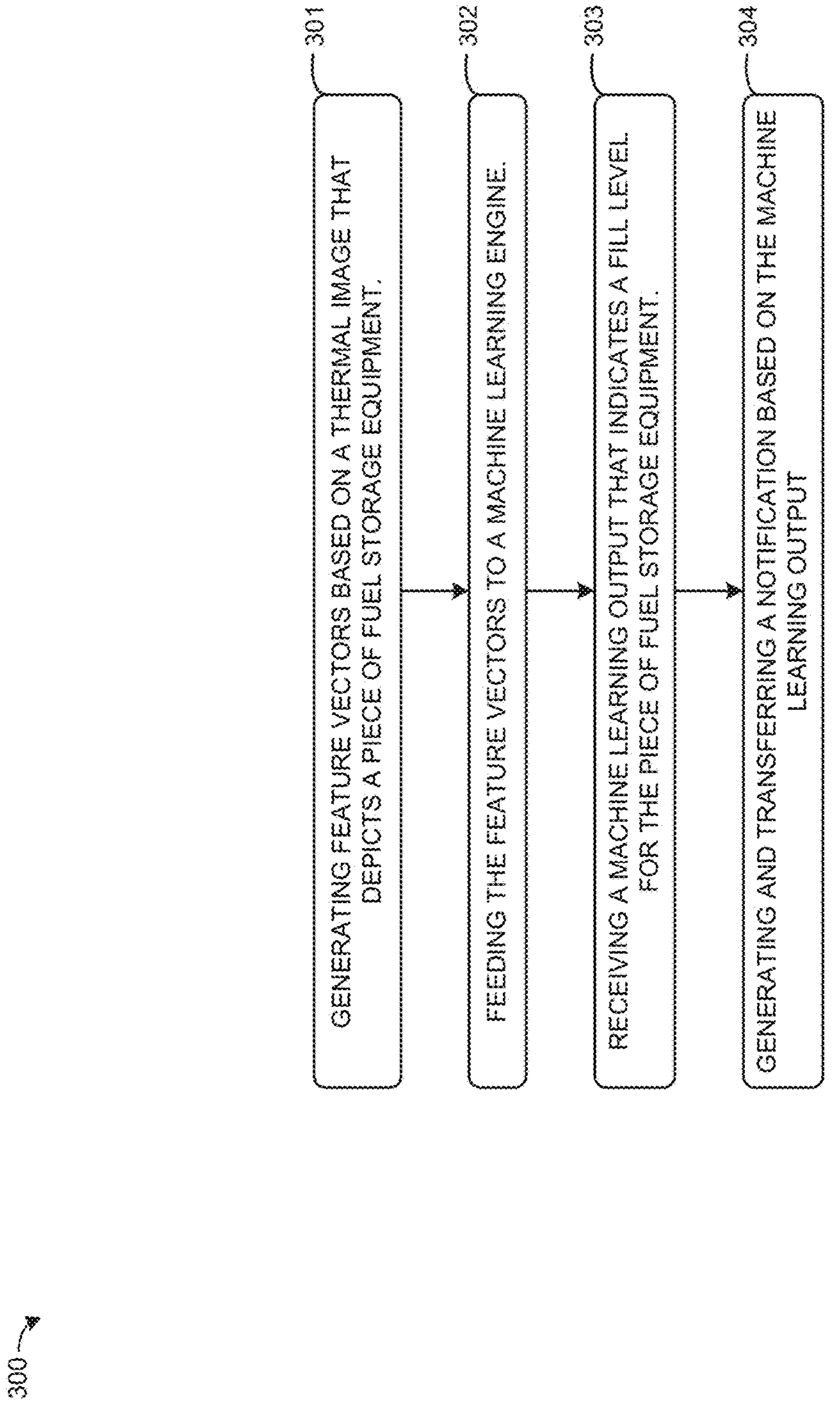
FIG. 3 illustrates an exemplary fill level detection process.

In some examples, environment 100 implements process 300 illustrated in FIG. 3. In some examples, environment 100 implements process 400 illustrated in FIG. 4. It should be appreciated that the structure and operation of environment 100 may differ in other examples.

Figure 2:
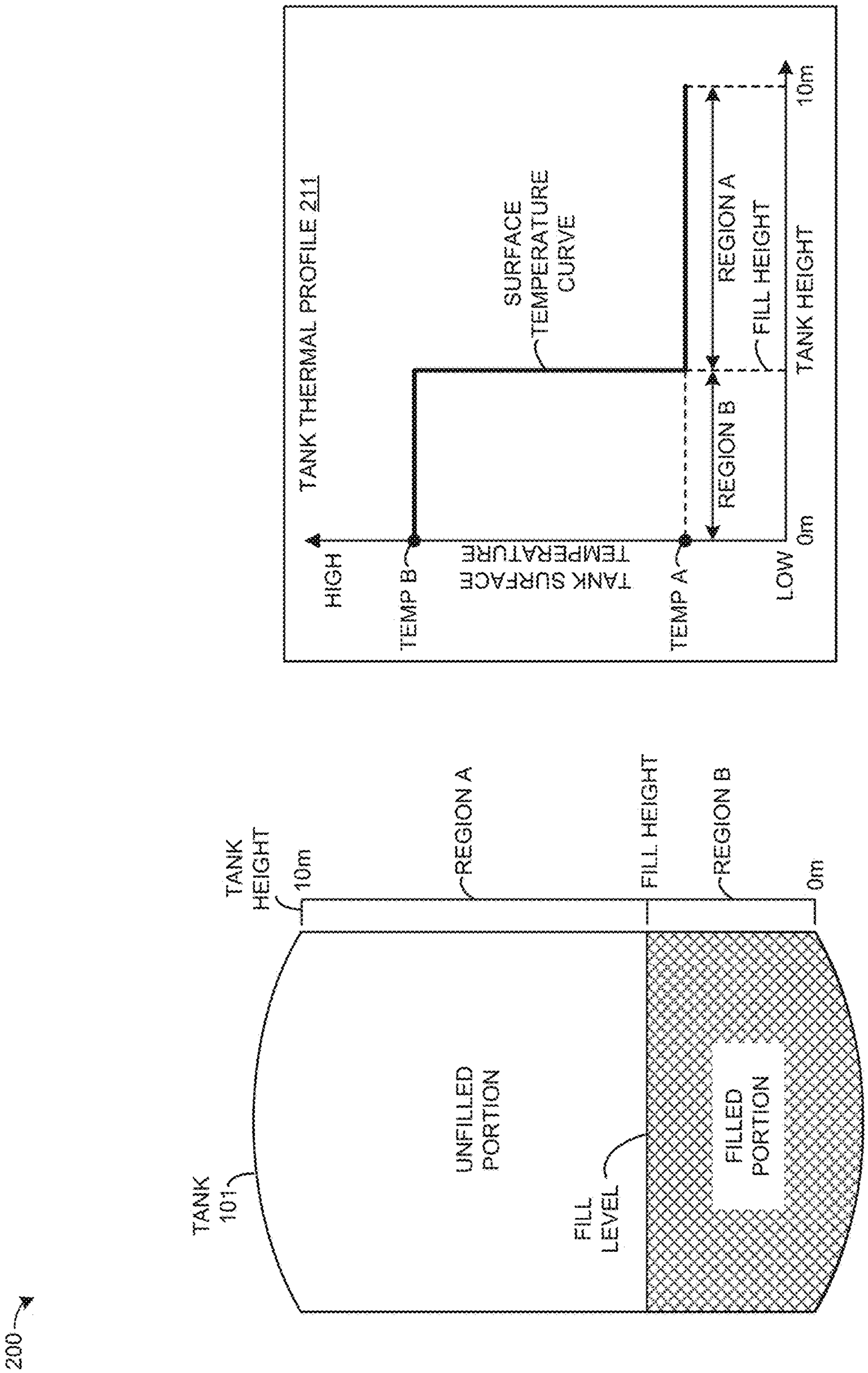
FIG. 2 illustrates an exemplary fuel storage device and device thermal profile.

FIG. 2 illustrates environment 200. Environment 200 comprises tank 101 and tank thermal profile 211. Tank 101 comprises a piece of fuel storage equipment to contain petrochemicals like petroleum, refined petroleum products like gasoline, LNG, and the like. In this example, tank 101 is a 10 m tall tank that is partially filled with fuel. As illustrated in FIG. 3, the height segment that corresponds to the unfilled portion of tank 101 is labeled Region A while the height segment that corresponds to the filled portion of tank 101 is labeled Region B. Region B extends from the tank base at 0 m to the fill height. Region A extends from the fill height to the tank height as 10 m.

Tank thermal profile 211 is a graph that depicts the relationship between the surface temperature of tank 101 and the height of tank 101. The x-axis of the graph represents tank height in the range 0 m-10 m and the y-axis of the graph represents tank surface temperature in the range low-high. These ranges are exemplary and may differ in other examples. As illustrated in FIG. 3, tank height correlates to tank surface temperature according to the surface temperature curve. Tank heights that fall within Region B comprise surface temperature (TEMP) B while tank heights that fall within Region A comprise surface temperature A. The change from surface temperature B to surface temperature A corresponds to the fill height of tank 101.

As depicted by tank thermal profile 211, temperature B is higher than temperature A. The temperature difference is the result of differences in thermal conductivity and heat capacity between liquids and gases. In this example, the filled portion of tank 101 holds a liquid petroleum product while the remaining unfilled portion of tank 101 generally contains a mixture of air and petrochemical vapors like methane, ethane, benzene, and the like. Liquid petroleum products have a higher heat capacity and thermal conductivity than the petroleum vapor/air mixture in the unfilled portion. The difference in heat capacity and thermal conductivity between the liquid and the vapor/air mixture causes the liquid and the vapor/air mixture to have different temperatures. Consequently, the portions of tank 101 that fall within Region B have a different temperature than the portions of tank 101 that fall within Region A. Although not visible in the visible light spectrum, the resulting surface temperature difference is visible in the infrared spectrum. A machine learning model (e.g., model 122) can process thermal images showing tank 101 in the infrared spectrum, detect the surface temperature difference between the filled and unfilled portions, and responsively identify the fill level in tank 101 as the interface between the different temperatures. In other examples, temperature B may be lower than temperature A.

FIG. 3 illustrates process 300. Process 300 comprises a fuel level detection process in a fuel extraction and storage environment. In other examples, process 300 may differ. Process 300 may be implemented in program instructions in the context of any of the software applications, imaging components, module components, machine learning components, or other such elements of one or more computing devices. The program instructions direct the computing device(s) to operate as follows, referred to in the singular for the sake of clarity.

The operations of process 300 comprise generating feature vectors based on a thermal image that depicts a piece of fuel storage equipment (step 301). The operations further comprise feeding the feature vectors to a machine learning engine (step 302). The operations further comprise receiving a machine learning output that indicates a fill level for the piece fuel storage equipment (step 303). The operations further comprise generating and transferring a notification based on the machine learning output (step 304).

Referring back to FIG. 1, environment 100 includes a brief example of process 300 as employed by one or more applications hosted by the various computing and imaging devices that compose environment 100.

In operation, camera 111 views tank 101 and the surrounding environment. For example, camera mount 112 may rotate and adjust the tilt of camera 111 to focus the field of view of camera 111 on tank 101. Camera 111 generates infrared video footage by viewing tank 101. The video footage comprises a sequence of infrared image frames that form a video depicting tank 101 and its surrounding environment. Camera 111 transfers the video footage to model computer 121 over wired links or over wireless links using wireless networking protocols like Bluetooth or WIFI. In alternative examples, camera 111 may generate and transfer one or more still frame infrared images instead of video footage.

Model computer 121 receives video footage from camera 111 (step 301) and vectorizes the received data to configure the video footage for ingestion by machine learning model 122 (step 302). Model computer 121 may host an interface application to vectorize the received data. For example, the interface application may implement a feature extraction process on the video footage. Generally, the feature extraction process comprises assigning numeric values to each pixel (or group of pixels) in the images that comprise the video footage. The interface application may group the numeric values of corresponding pixels from the video frames to generate feature vectors. Once generated, the interface application may feed the feature vectors to machine learning model 122.

Machine learning model 122 ingests and processes the feature vectors representing the video footage using its constituent machine learning algorithms. Machine learning model 122 comprises equipment detection algorithms, fill level detection algorithms, and shadow/reflection detection algorithms. Machine learning model 122 generates a machine learning output that indicates the fill level in storage tank 101. For example, machine learning model 122 may utilize its equipment detection algorithms to identify tank 101 in the video footage. Equipment detection algorithms identify part of the image as segments that correspond to specific devices, people, cars, equipment, and the like. For example, model 122 may identify a group of pixels in a frame that corresponds to a segment that can be identified by a human as a known object.

Machine learning model 122 uses its fill level detection algorithms to identify the fill level in tank 101 based on the thermal profile on the surface of tank 101. As discussed in FIG. 3, the filled portion of tank 101 has a different heat capacity and thermal conductivity than the unfilled portion of tank 101. Accordingly, the surface of tank 101 that corresponds to the filled portion of tank 101 appears differently in infrared images than the surface of tank 101 that corresponds to the unfilled portion of tank 101. For example, the surface of tank 101 that corresponds to the filled portion of tank 101 may appear hotter in the infrared image. The fill level detection algorithms identify tank 101 based on the output from the equipment detection algorithms and identify color differences in the thermal footage of tank 101 to detect the filled and unfilled portions of tank 101. The fill level detection algorithms determine the fill level of tank 101 at the interface of the color corresponding to the filled portion and the color corresponding to the unfilled portion. In some examples, the fill level detection algorithms determine the height of the fill level or total fuel volume in tank 101. Model computer 121 may be provisioned with tank dimensions like height, diameter, and volume and fuel properties like density. The fill level detection algorithms may determine the fill percentage based on the amount of unfilled space and filled space in tank 101 depicted in video footage (e.g., 25% of tank 101 is filled). The fill level detection algorithms then determine metrics like filled height, filled volume, or fuel mass based on the provisioned tank dimensions and fuel properties (e.g., tank 101 may be 10 m tall and 25% full which indicates a 2.5 m fill height).

Machine learning model 122 uses its shadow/reflection detection algorithms to screen for false positive tank level signatures. Shadows and reflections on the surface of tank 101 can alter the thermal profile of the surface of tank 101 by increasing or decreasing the tank surface temperature. The fill detection algorithms may erroneously detect shadows and/or reflections on tank 101 as fill levels. The shadow/reflection detection algorithms are trained to detect shadows and reflections in thermal images to inhibit false positive readings from the fill level detection algorithm.

Model 122 generates a machine learning output that indicates the presence of the fill level of tank 101 based on the outputs of the equipment detection algorithms, the fill level detection algorithms, and the shadow/reflection algorithms. Model 122 transfers the machine learning output to user computer 131. User computer 131 receives and processes the machine learning output (step 303) and application 132 displays tank footage 133 and fill metrics indicated by the machine learning output. Tank footage 133 may depict infrared still frame images and/or video footage of tank 101 that is annotated by machine learning model 122 to mark the filled portion and fill level of tank 101. Fill metrics 134 may comprise information like fill percent, fill level height, fuel volume, fuel mass, and the like. User computer 131 transfers a notification to cloud service 141 (step 304). The notification may be transferred in response to a user input or as part of an automated process. Exemplary notifications include fill commands to add fuel, to not add fuel, or to remove fuel from tank 101. Cloud services 141 distributes the notification to desired endpoints like operator and control systems for tank 101.

Advantageously, environment 100 effectively and efficiently utilizes machine learning systems to detect fill levels in petrochemical storage and transfer equipment. Moreover, environment 100 employs machine learning model 122 to ingest infrared images depicting storage tank 101 to measure the fill level in tank 101 based on tank 101's surface temperature thermal profile.

Figure 4:
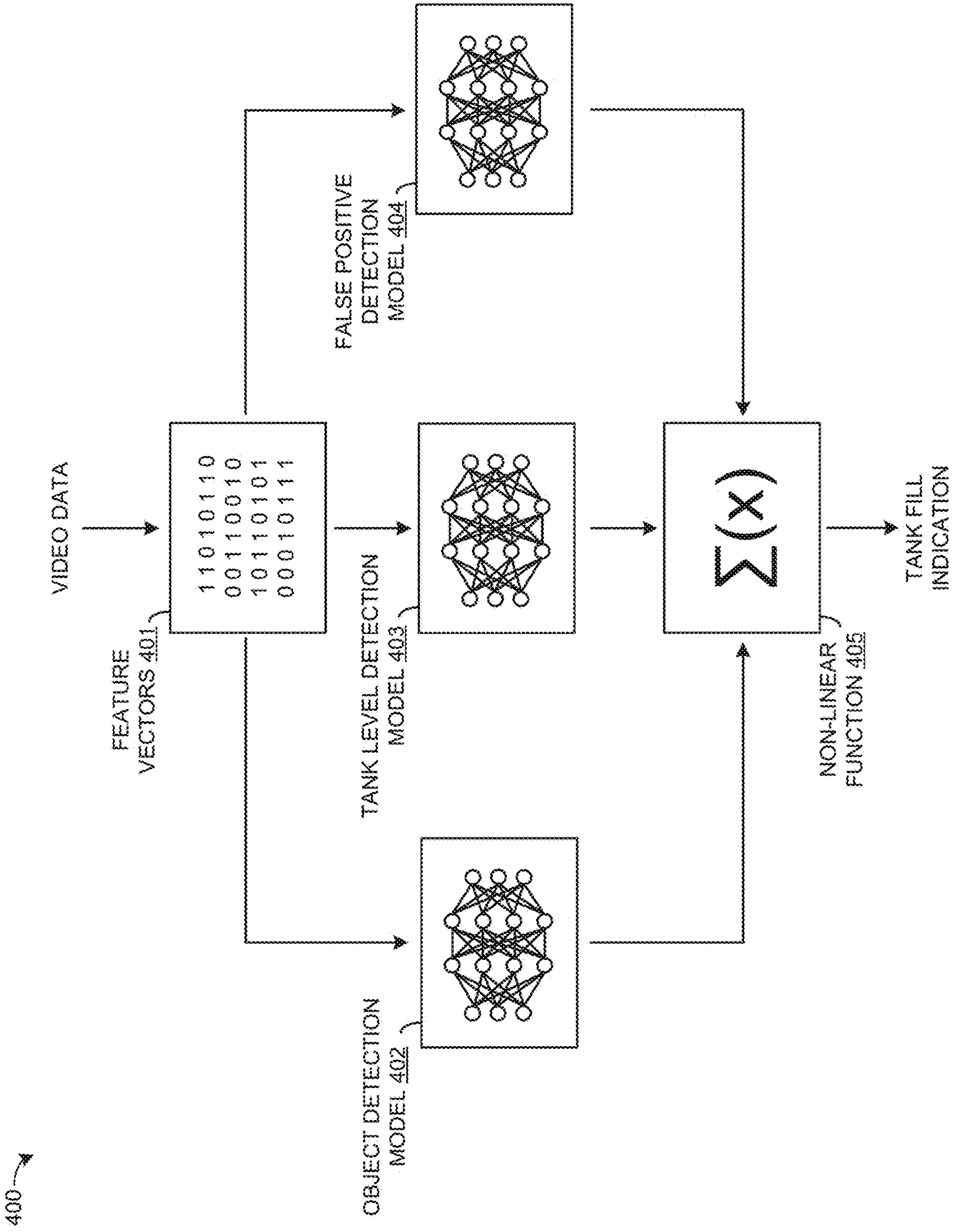
FIG. 4 illustrates an exemplary fill level detection process.

FIG. 4 illustrates process 400 to detect fill levels in fuel storage and extraction environments. In other examples, process 400 may differ. Process 400 is illustrated as a functional block diagram and includes feature vectors 401, object detection model 402, tank level detection model 403, false positive detection model 404, and non-linear function 405. Process 400 may be implemented in program instructions in the context of any of the software applications, imaging components, module components, machine learning components, or other such elements of one or more computing devices. Feature vectors 401 are representative of machine learning inputs to models 402-404 that comprise a numerical representation of infrared image data that depicts a piece of fuel storage environment. Object detection model 402 comprises a machine learning model trained to segment the infrared image to identify and classify petrochemical storage and transfer equipment. Tank level detection model 403 comprises a machine learning model trained to measure fuel fill levels in fuel storage equipment based on surface temperature differences in the filled and unfilled portions of the storage environment. False positive detection model 404 is a machine learning model trained to detect shadows and reflections on the surface of fuel storage equipment to screen for false positive readings from tank level detection model 403. It should be appreciated that reflections and shadows can cause surface temperature differences on the surface of fuel storage equipment that may be misidentified by level detection model 403. False positive detection model 404 also removes any effects from other objects that block the view of the camera to the tank like pipes, stairs, or other equipment that may affect machine learning model 403. Non-linear function 405 comprises a machine learning model configured to ingest outputs from models 402-404 and generate a fill level indication for the piece of fuel storage equipment.

In operation, a computing device receives infrared video data depicting the fuel storage environment. The computing device vectorizes the infrared video data to generate feature vectors 401. For example, the computing device may assign numeric values that represent the color of each pixel in the image frames that compose the infrared video data and form the feature vectors using the numeric values.

Object detection model 402 ingests feature vectors 401 that represent the infrared video and segments parts of the frames that correspond to a known object in the field of view of the camera. Using object detection helps reduce false positive fill level detection and relates each measured fill level to an actual piece of equipment device in the field. Object detection model 402 generates an output that indicates regions of the infrared video that comprise fuel storage and transfer equipment. Object detection model 402 may also detect other equipment that blocks the view of the camera to the tank, for example any pipe or stairs. False positive detection model 404 may automatically remove the obstructing objects from the image to create a clearer view of the tank and reduce false positives. Object detection model 402 transfers its output to non-linear function 405. In some examples, objection detection model 402 may also provide its output to tank level detection model 403 and false positive detection model 404.

Tank level detection model 403 model ingests feature vectors 401 and segments parts of the video frames that correspond to known thermal signatures for unfilled and filled fuel storage vessels. Tank level detection model 403 model classifies thermal signatures that correspond to the unfilled portions as being unfilled and classifies thermal signatures that correspond to the filled portions as being filled. Tank level detection model 403 model marks the interface between the filled and unfilled portions as the fill level. Tank level detection model 403 generates an output that indicates regions of the infrared video that comprise fill levels and transfers its output to non-linear function 405.

False positive detection model 404 ingests feature vectors 401 and segments parts of the video frames that correspond to known thermal signatures for reflections and shadows. False positive detection model 404 removes the effects of any blocking object that may reduce the accuracy of fill level detection model 402. False positive detection model 404 model classifies thermal signatures that correspond to the reflections as reflections and classifies thermal signatures that correspond to the shadows as being shadows. False positive detection model 404 generates an output that indicates regions of the infrared video that comprises shadows, reflections, and/or any blocking object and transfers its output to non-linear function 405.

Non-linear function 405 combines the machine learning outputs generated by models 402-404 to confirm fill level indications from tank level detection model 403. Non-linear function 405 overlays the object detection output with the fill level detection output and discards fill level indications that do not correspond to fuel storage equipment. For example, tank level detection model 403 may identify a shadow cast on the ground as a fill level and non-linear function 405 may discard this indication since it is not co-located with a piece of storage equipment identified by object detection model 402. Non-linear function 405 overlays the false positive detection output with the fill level detection output and discards fill level indications that correspond to false positive readings. For example, tank level detection model 403 may classify a reflection on the surface of a piece of fuel storage equipment as a fill level and non-linear function 405 may discard this indication since it is co-located with a reflection identified by false positive detection model 404.

Non-linear function 405 confirms the remaining fill indications that have not been discarded. By discarding fill indications based on co-location with false positive signatures, non-linear function 405 inhibits false-positive fill level detection from model 403. Non-linear function 405 determines additional metrics for the fill indications like percent full, fill height, fuel volume, fuel mass, and the like. Non-linear function 405 generates an output that comprises the confirmed tank fill levels and the metrics. Non-linear function 405 transfers the fill level indication to user computing systems for review by human operators.

Figure 5:
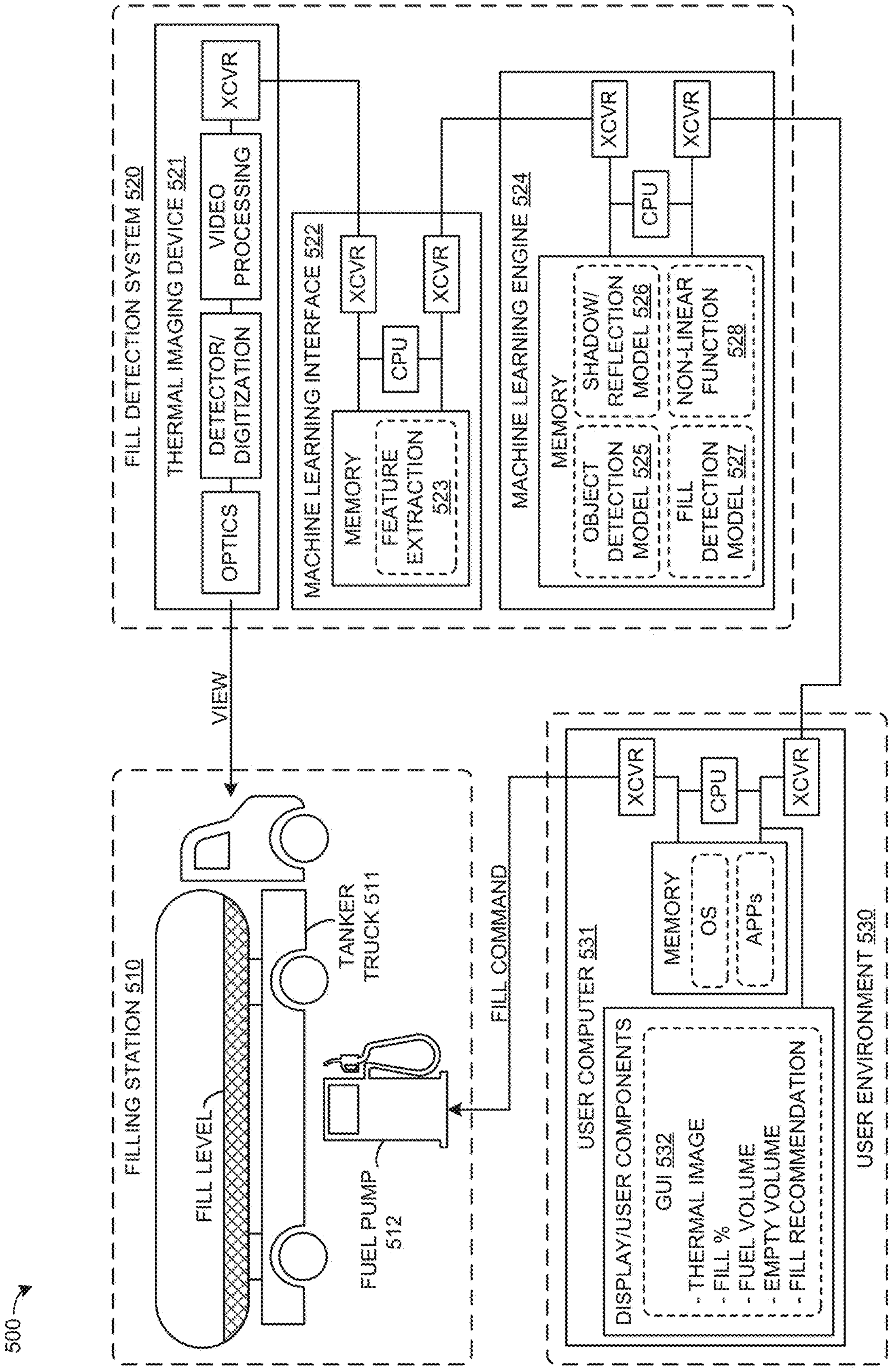
FIG. 5 illustrates an exemplary fill level detection system.

FIG. 5 illustrates environment 500 to detect fill levels in fuel storage and extraction environments. Environment 500 comprises an example or environment 100, however environment 100 may differ. Environment 500 comprises filling station 510, fill detection system 520, and user environment 530. Filling station 510 comprises tanker truck 511 and fuel pump 512. Fill detection system 520 comprises thermal imaging device 521, machine learning interface 522, and machine learning engine 524. Machine learning interface 521 hosts feature extraction application 523. Machine learning engine 524 hosts objection detection model 525, shadow/reflection model 526, fill detection model 527, and non-linear function 528. User environment 530 comprises user computer 531 which comprises Guided User Interface (GUI) 532. In other examples, environment 500 may include fewer or additional components than those illustrated in FIG. 5. Likewise, the illustrated components of environment 500 may include fewer or additional components, assets, or connections than shown.

Filling station 510 is representative of a facility to fill petroleum transport vehicles like tanker trucks or tanker rail cars. Tanker truck 511 comprises a petroleum transport vehicle with a partially full fuel vessel. Fuel pump 512 comprises a pump to add petroleum to the fuel vessel carried by tanker truck 511. Filling station 510 may comprise other objects like a building or human operator.

Fill detection system houses thermal imaging device 521, machine learning interface 522, and machine learning engine 524. Thermal imaging device 521 is representative of a Forward Looking Infrared (FLIR) camera to image tanker truck 511. Thermal imaging device 521 comprises optics, photon detection and digitization circuitry, video processing circuitry, and a transceiver (XCVR) connected over bus circuitry. Thermal imagining device 521 also comprises a pan and tilt system, however these elements are omitted for clarity. The pan and tilt system rotates device 521 along a horizontal axis and may adjust the roll, yaw, and pitch to focus the optics on a desired field of view. The pan and tilt system comprises electric motors, actuators, and the like that operate in response to control signaling received from a device controller. Optics 521 comprises components like lens to capture photons in the infrared spectrum and reflect radiation in the visible and ultraviolet spectrums. Photons reflected and emitted by tanker truck 511 in the infrared spectrum enter the optics and are passed to the detector/digitation circuitry. The detector/digitization circuitry comprises a Focal Plane Array (FPA) of micrometer size pixels constructed from infrared sensitive materials. The detector/digitation circuitry detects the photons and generates a corresponding digital signal that represents the surface temperature of tanker truck 511 and passes this signal to the video processing circuitry. The video processing circuitry comprises components like Digital Signal Processors (DSPs) to translate the digital signal into and infrared image of tanker truck 511. The transceiver transfers the resulting thermal image to machine learning interface 522 over a communication link. In this example, imaging device 521, interface 522, and engine 524 are integrated into a single housing and communicate using local connections like sheathed metallic wiring and bus circuitry. However, in examples where imaging device 521, interface 522, and engine 524 are not co-located, their communication links may comprise wired and/or wireless connections that traverse a private Local Area Network (LAN) and/or public internet links supported by internet backbone providers.

Machine learning interface 522 is a computing device comprising transceivers, CPU, and memory coupled over bus circuitry. Machine learning interface 522 typically comprises other computing elements like power supply however these are omitted for clarity. The memory stores feature extraction application 523 and typically other software like operating systems, communication protocols, and the like. A transceiver in interface 522 receives the thermal image generated by device 521. The CPU retrieves and executes feature extraction application 523 from memory to vectorize the thermal image. Feature extraction application 522 is representative of one or more applications, modules, and the like to convert thermal images into a consumable format for machine learning engine 524. Application 522 generates numeric representations of the pixels that compose the thermal image and groups the numeric representations into feature vectors. A transceiver in interface 522 transfers the feature vectors to machine learning engine 524. In some examples, machine learning interface 522 and machine learning engine 524 may comprise a single device. For example, machine learning interface 522 may be omitted and machine learning engine 524 may additionally host feature extract application 523.

Machine learning engine 524 is a computing device comprising transceivers, CPU, and memory coupled over bus circuitry. Machine learning engine 524 typically comprises other computing elements like power supply and GPU however these are omitted for clarity. The memory stores object detection model 525, shadow/reflection model 526, fill detection model 527, non-linear function 528, and typically other software like operating systems, communication protocols, and the like. Object detection model 525 comprises algorithms trained to classify petroleum storage equipment in thermal images depicting filling station 510. Shadow/reflection model 526 comprises algorithms trained to detect shadows and reflections in thermal images depicting filling station 510. Fill detection model 527 comprises algorithms trained to detect fuel vessel fill levels in thermal images depicting filling station 510. Non-linear function model 528 comprises algorithms trained to confirm fill indications, screen for false positive outputs, and calculate metrics to characterize the detected fill level.

A transceiver in machine learning engine 524 receives the feature vectors from machine learning interface 522. The CPU retrieves and executes models 525-528 from memory. Object detection model 525 processes the feature vectors to identify portions of the thermal image the depict the fuel vessel of tanker truck 511. Shadow/reflection model 526 processes the feature vectors to identify portions of the thermal image that depict shadows and reflections. Fill detection model 527 processes the feature vectors to identify portions of the thermal image that depict the fill level of the fuel vessel carrier by tanker truck 511. Non-linear function 528 processes the outputs from models 525-527 to confirm the detected fill level and calculate metrics to characterize the height of the fill level, the volume of the fuel, and the like. Non-linear function 528 generates a machine learning output comprising the detected fill level and the associated metrics. A transceiver in machine learning engine 524 transfers the machine learning output to user computer 531 over a wired/wireless communication link (e.g., a private LAN link).

User computer 531 is a computing device comprising transceivers, CPU, memory, a display, and user components coupled over bus circuitry. Machine learning engine 524 typically comprises other computing elements like power supply and GPU however these are omitted for clarity. The memory stores an operating system (OS), user applications, and typically other software like communication protocols and firmware. The display and user components comprise components like touch screens, computer monitors, keyboards, computer mice, and/or other devices to facilitate user interaction with the applications stored by the memory. The display and user components present GUI 532. GUI 532 comprises graphical elements to display information received from machine learning engine 524 and to receive user inputs to control the fill level in tanker truck 511.

A transceiver in user 531 computer receives the machine learning output generated by machine learning engine 524. The CPU executes the user applications to render GUI 532 on the display. The CPU populates GUI 532 with the information received in the machine learning output including the thermal image of tanker track 511, the detected fill level, the fill percentage, current fuel volume, current empty volume, and a fill recommendation. In other examples, GUI 532 may comprise additional information like truck Identifier (ID) numbers, location data, fuel type data, and the like. In this example, the user components receive a user input to fill tanker truck 511. The input may specify an amount of fuel to be added to truck 511 or a desired fill percentage. The CPU drives a transceiver to transfer the fill command to fuel pump 512. Fuel pump 512 adds fuel to tanker truck 511 based on the fill command.

In some examples, environment 500 may omit user environment 530 and machine learning engine 524 may generate fill commands for fuel pump 512 autonomously. For example, non-linear function 528 may process the outputs from models 525-527 to confirm the detected fill level and calculate metrics to characterize the current volume of fuel and the available tank volume. Non-linear function 528 then determines an amount fuel to be added to tanker truck 511 based on the available tank volume. A transceiver in machine learning engine 524 transfers the fill command to fuel pump 512 directing fuel pump 512 to add the amount of fuel determined by non-linear function 528 to tanker truck 511. Fuel pump 512 adds that amount of fuel to tanker truck 511.

In some examples, user computer 531 may host machine learning training applications to annotate training data sets to train machine learning models 525-528 to measure the fill level in tanker truck 511. For example, a user may interface with the display and user components to annotate thermal images of tanker trucks and other fuel storage vessels. The annotations identify fuel storage equipment, fill levels, shadows, and reflections. To annotate a thermal image, the user indicates which pixels in the image depict the fuel storage equipment, the fill level, shadows, and reflections. A transceiver in user computer 531 transfers the training data to machine learning interface 522. A transceiver in machine learning interface 522 receives the training data from user computer 531 and the CPU retrieves and executes feature extraction 523. Feature extraction application 523 vectorizes the training data for models 525-528. A transceiver in machine learning interface 522 transfers the vectorized training data to machine learning engine 524. A transceiver in machine learning engine 524 receives the training data and the CPU executes models 525-528. Models 525-528 ingest their corresponding training data to train their constituent machine learning algorithms to detect fuel storage objects, detect fill levels, detect shadows/reflections, and generate fill indications.

Figure 6:
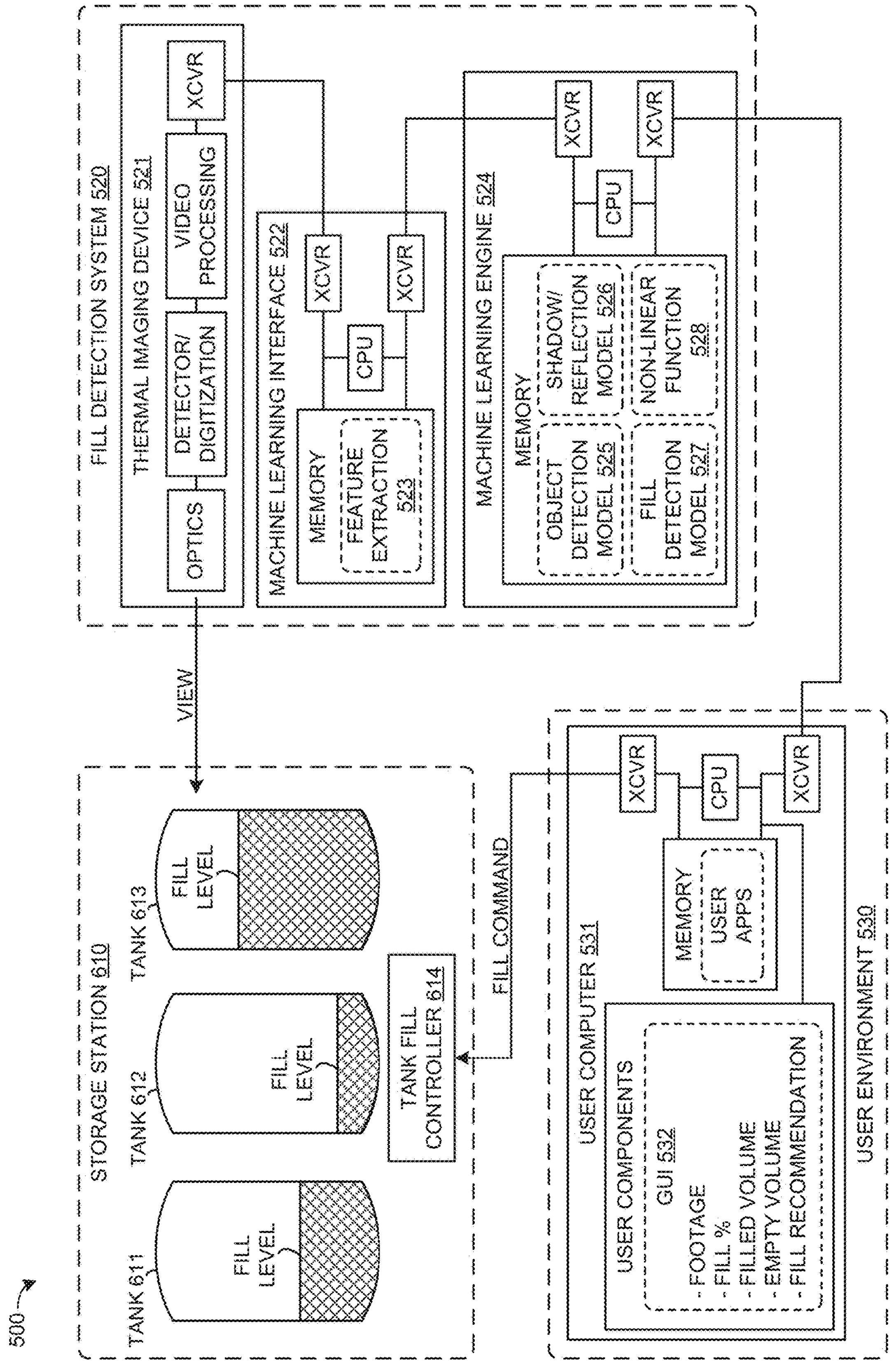
FIG. 6 illustrates an exemplary fill level detection system.

FIG. 6 illustrates an alternative embodiment of environment 500. In this example, filling station 510 is replaced with storage station 610. Storage station 610 comprises fuel storage tanks 611-613 and tank fill controller 614. Fill detection system 520 and user environment 530 may operate as described above with respect to FIG. 5 to determine the fill levels of tanks 611-613 based on thermal images and transfer fill commands to tank fill controller 614 to increase, decrease, or maintain the detected fill levels in tanks 611-613.

Figure 7:
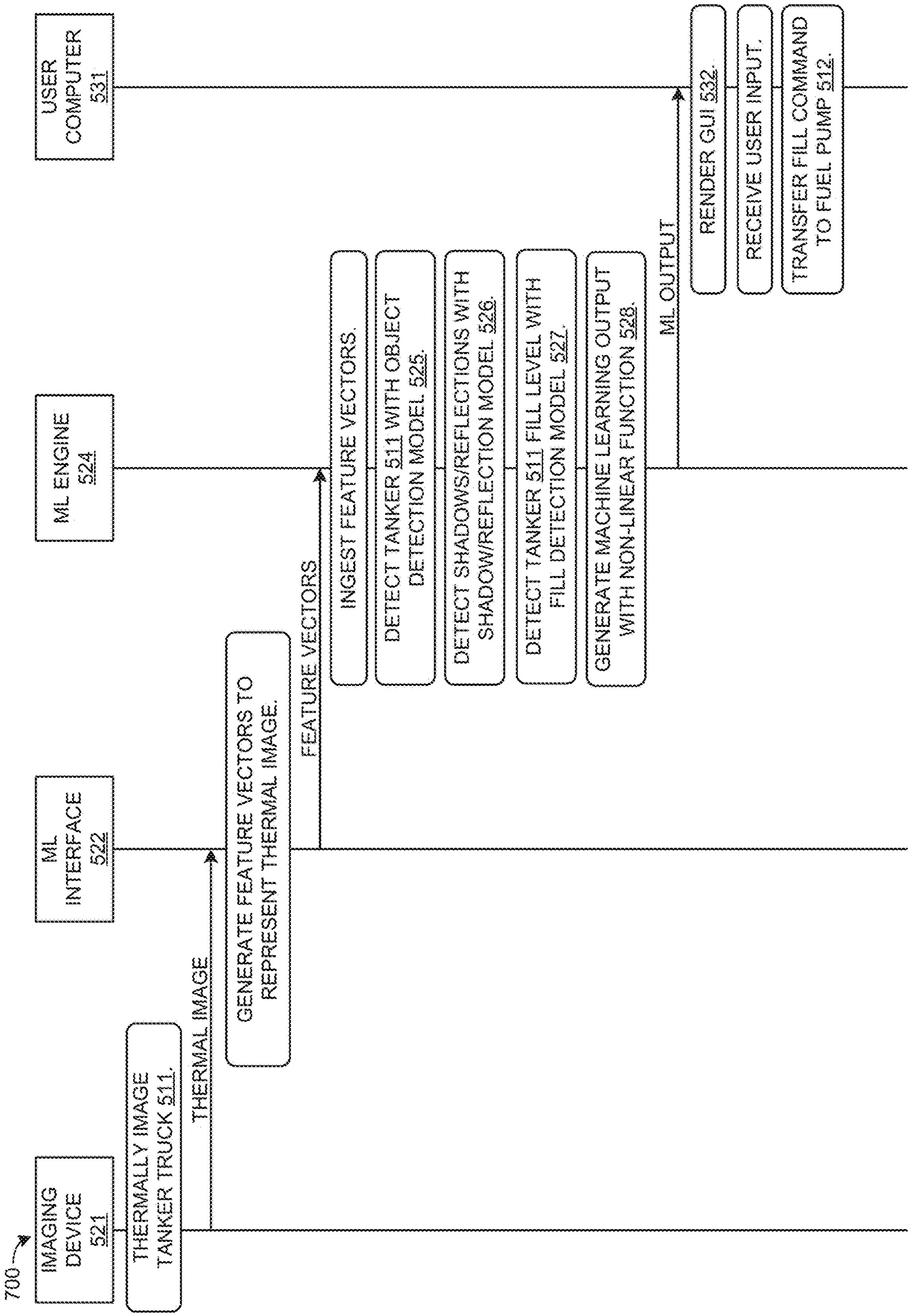
FIG. 7 illustrates an exemplary fill level detection process.

FIG. 7 illustrates process 700. Process 700 comprises an exemplary operation of environment 500 to measure tank fill level in tanker truck 511. In operation, imaging device 521 measures infrared radiation emitted from tanker truck 511 and generates a thermal image depicting the surface temperature profile of truck 511. The empty section and the filled section of the fuel vessel carried by tanker truck 511 have different temperatures. Accordingly, in the thermal image, the empty section and the filled section of the fuel vessel carried by tanker truck 511 are colored differently. The interface between the two colors corresponds to the fill level of tanker truck 511. Imaging device 521 transfers the thermal image to machine learning (ML) interface 522.

Machine learning interface 522 executes feature extraction application 523. Feature extraction application 523 generates a numeric representation of the thermal image consumable by models 525-528. Machine learning interface 522 provides the feature vectors to machine learning engine 524. Object detection model 525 ingests the feature vectors and detects the portion of the image that depicts the fuel storage vessel carried by tanker truck 511. Object detection model 525 indicates its output to shadow/reflection model 526 and fill level detection model 527.

Shadow/reflection model 526 identifies the fuel vessel of tanker truck 511 in the thermal image based on the output from object detection model 525 and identifies any shadows or reflections on the surface of fuel vessel. Shadow/reflection model 526 provides its output to non-linear function 528.

Fill level detection model 527 ingests the feature vectors and the output from object detection model 525. Fill detection model 527 identifies the fuel vessel of tanker truck 511 based on the output from object detection model 525 determines the fill level of tanker truck 511 based on the color difference between the empty section and the filled section of the fuel vessel carried by tanker truck 511 as depicted in the thermal image. Fill detection model 527 provides its output to non-linear function 528.

Non-linear function 528 receives the outputs from models 526 and 527. Non-linear function 528 compares the fill level detected by model 527 to any shadows or reflections detected by model 526. In this example, non-linear function 528 determines the detected fill level is not co-located with any shadows or reflections and in response, confirms the veracity of the detected fill level. Non-linear function 528 retrieves vessel metrics provisioned to engine 524 for the fuel vessel that indicate dimensions like tank height, tank width, tank volume, and the like. Non-linear function 528 determines the fill percentage for the fuel vessel based on the detected fill level and the total vessel height. For example, non-linear function 528 may determine the fill level pixel height, determine the total pixel height of the filled and unfilled sections, and calculate the ratio of the fill level pixel height and the total pixel height to determine the fill percentage. Non-linear function 528 applies the calculated fill percentage to the vessel metrics to determine the actual fill height, the actual fuel volume, and the actual unfilled volume. Non-linear function 528 generates a machine learning output comprising the thermal image, the fill level indication, the fill percentage, the actual fill height, the actual fuel volume, and the actual unfilled volume for tanker truck 511. Non-linear function 528 transfers the machine learning output to user computer 531.

User computer 531 renders GUI 532 to display the machine learning output. User computer receives a user input via GUI 532 to add fuel to tanker truck 511. In response to the user input, user computer 531 transfers a fill command to fuel pump 512 to add the amount of fuel to tanker truck 511 indicated in the user input. Fuel pump 512 receives the command and fills the fuel vessel accordingly.

Figure 8:
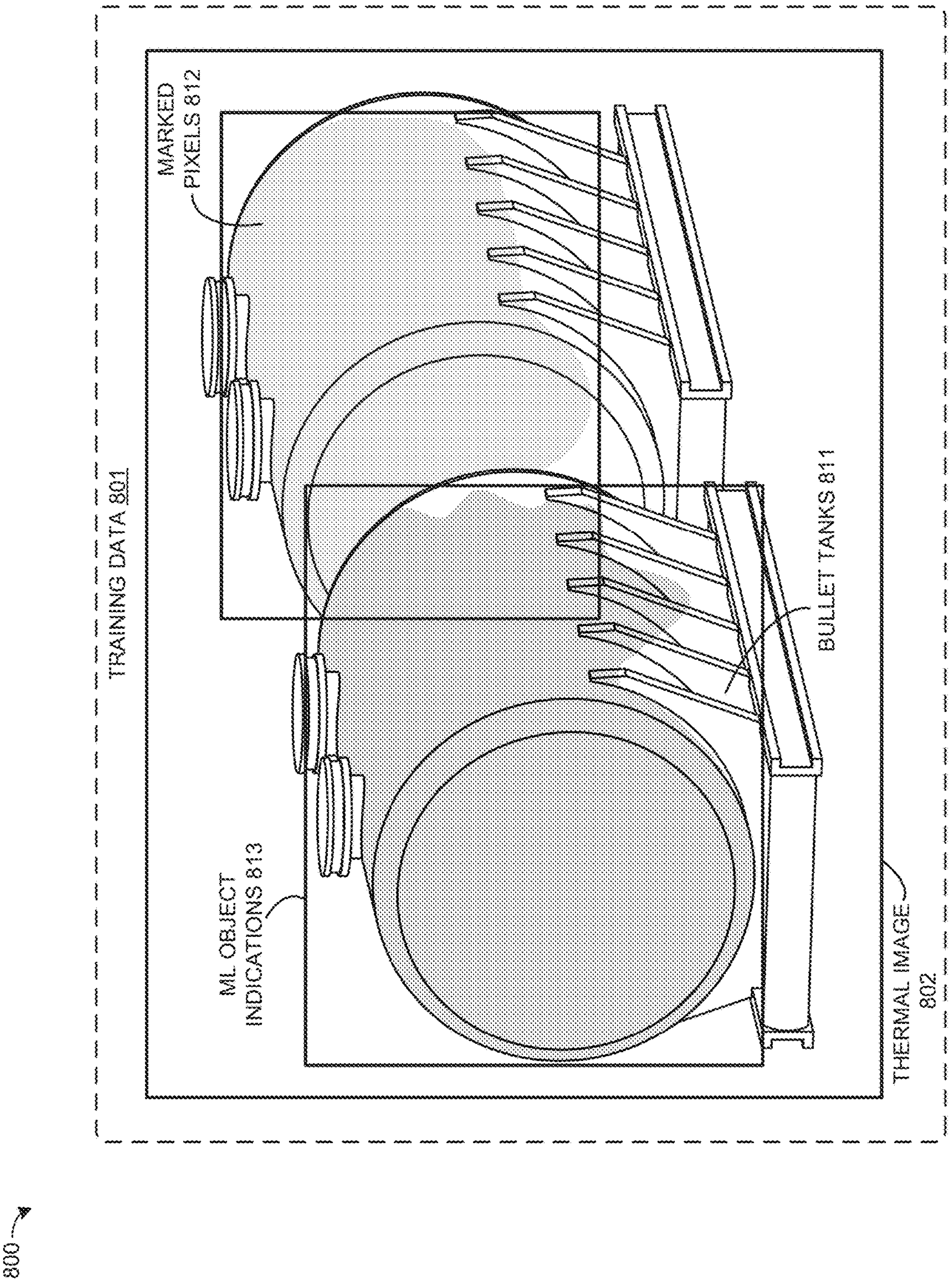
FIG. 8 illustrates an exemplary machine learning training input.

FIG. 8 illustrates environment 800. Environment 800 comprises training data 801. Training data 801 comprises an annotated image to train an object detection machine learning model (e.g., object detection model 525) to identify fuel storage equipment. Training data 801 comprises thermal image 802, bullet tanks 811, marked pixels 812, and machine learning (ML) object indications 813. Thermal image 802 comprises an infrared still frame image of bullet tanks 811. A human operator marks pixels that depict bullet tanks 811. For example, marked pixels 812 may comprise user generated annotations that identify the shape and location of bullet tanks 811 within thermal image 802. The annotations may comprise colored markings or some other type of indication to differentiate bullet tanks 811 from other objects in thermal image 802. Training data 801 is provided to a machine learning model to advance its constituent algorithms to classify bullet tanks in thermal images based on marked pixels 812. The model segments the training data to generate machine learning object indications 813 that identify bullet tanks 811. The human operator reviews object indications 813 and either rejects or accepts indications 813 based on their accuracy.

Figure 9:
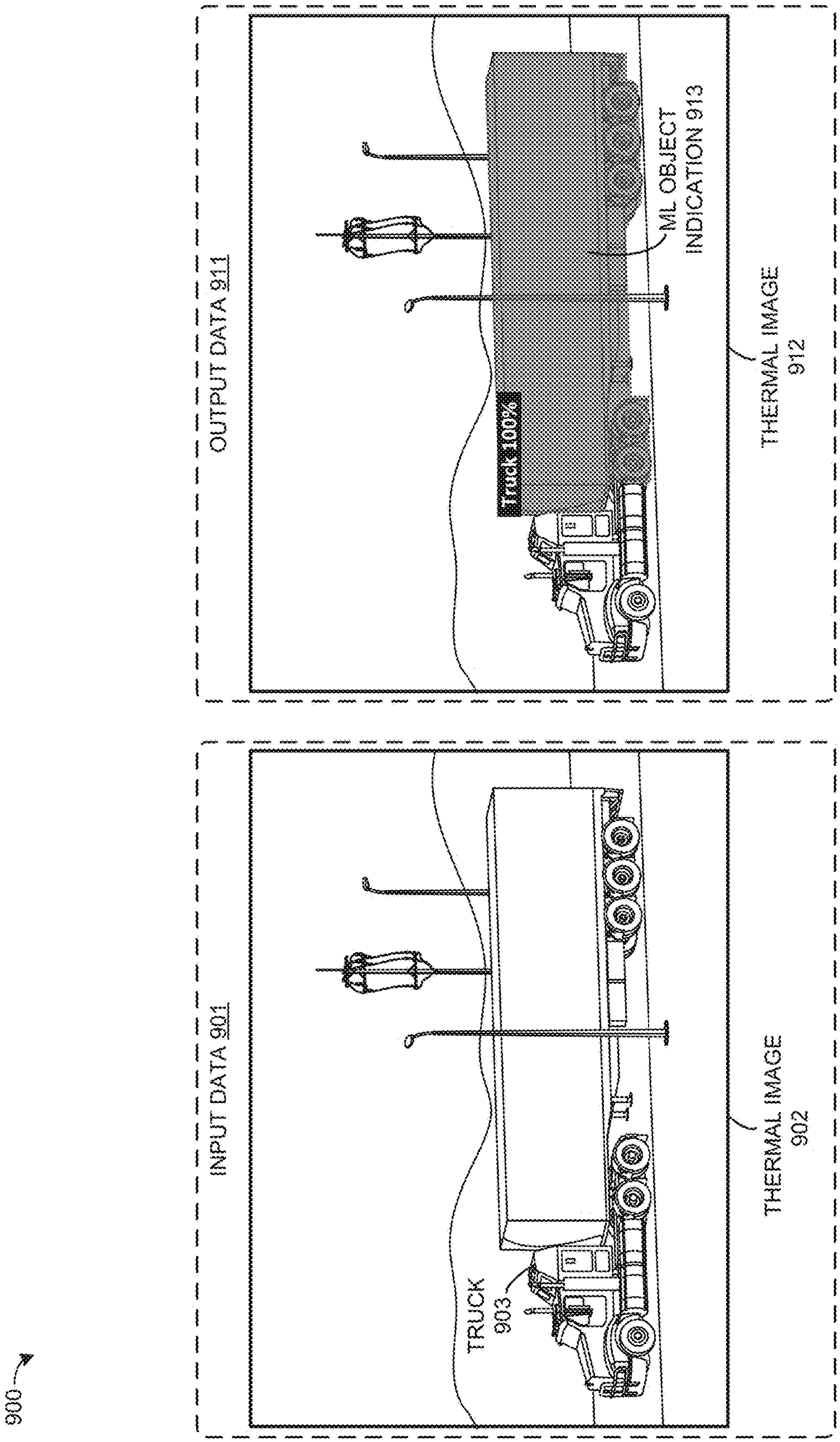
FIG. 9 illustrates an exemplary machine learning input and output.

FIG. 9 illustrates environment 900. Environment 900 comprises input data 901 and output data 911. Input data 901 is representative of a machine learning input and comprises thermal image 902 which illustrates truck 903. Output data 911 is representative of a machine learning output and comprise thermal image 912 which illustrates machine learning object indications 913. Thermal image 901 depicts the thermal profile of tanker truck 903. Image 901 is provided as input to a machine learning model trained to identify fuel storage equipment (e.g., object detection model 525). The machine learning model processes image 901 to generate thermal image 902. The machine learning model highlights the portions of the thermal image that depict the fuel vessel carried by the tanker truck as machine learning object indication 913. Output data 911 may be provided to other classifiers to detect the fill level of the tanker truck and false any positive signatures present in the thermal image.

Figure 10:
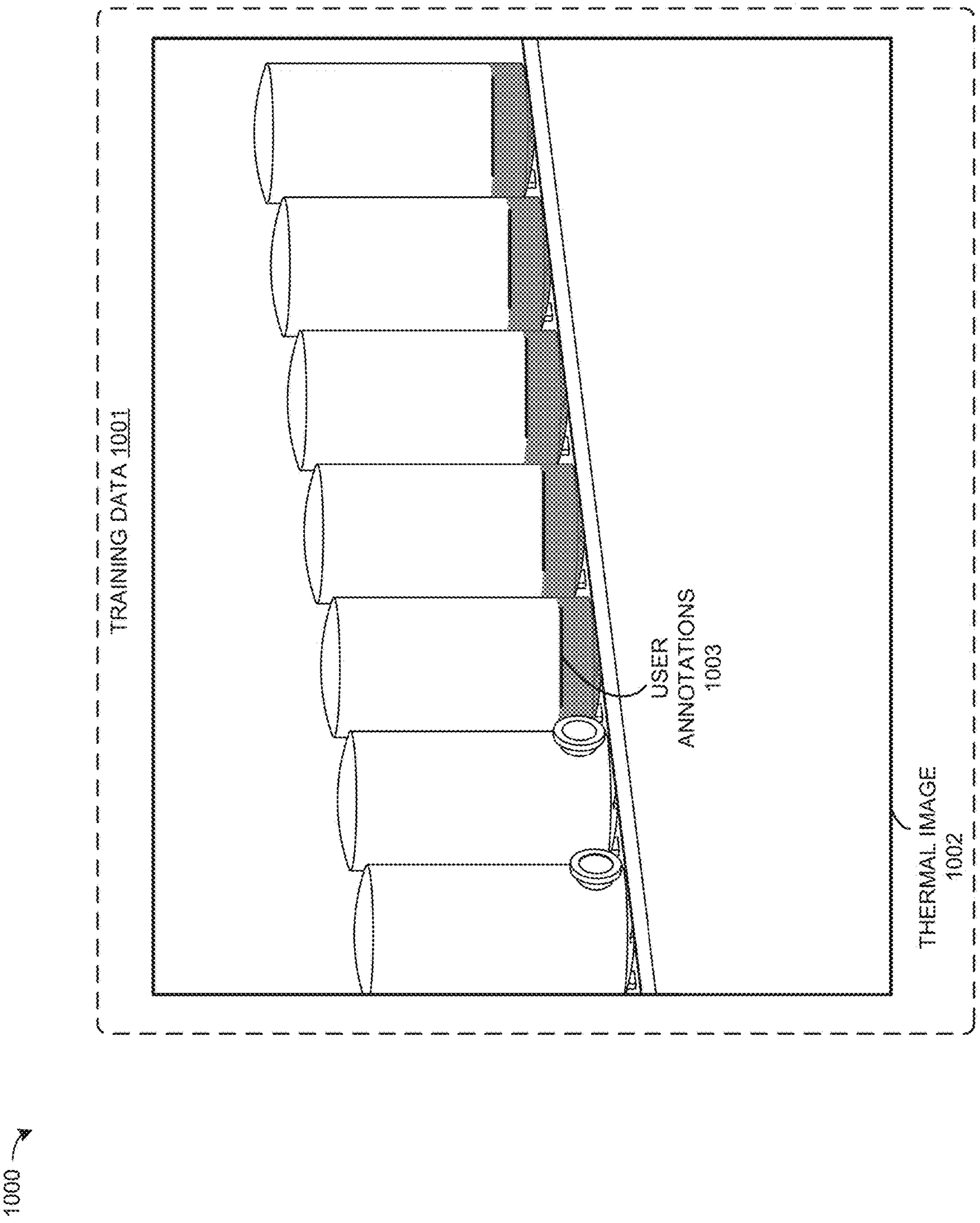
FIG. 10 illustrates an exemplary machine learning training input.

FIG. 10 illustrates environment 1000. Environment 1000 comprises training data 1001. Training data 1001 comprises an annotated image to train a fill level detection machine learning model to identify fill levels in fuel storage equipment (e.g., fill level model 527). Training data 1001 comprises thermal image 1002. Thermal image 1002 comprises an infrared still frame image of fuel storage vessels and includes user annotations 1003. A human operator marks pixels that depict the fill level in the fuel storage vessels to create user annotations 1003. For example, the marked pixels may comprise user generated annotations that identify the location of the fill level within thermal image 1002. The annotations may comprise colored markings or some other type of indication to differentiate the filled and unfilled portions of the storage tanks. Training data 1001 is provided to a machine learning model to advance its constituent algorithms to classify fill levels of fuel storage equipment in thermal images based on the marked pixels. The model segments the training data to generate fill level indications that identify the fill levels in the storage equipment. The human operator reviews the object indications and either rejects or accepts the indications based on their accuracy.

Figure 11:
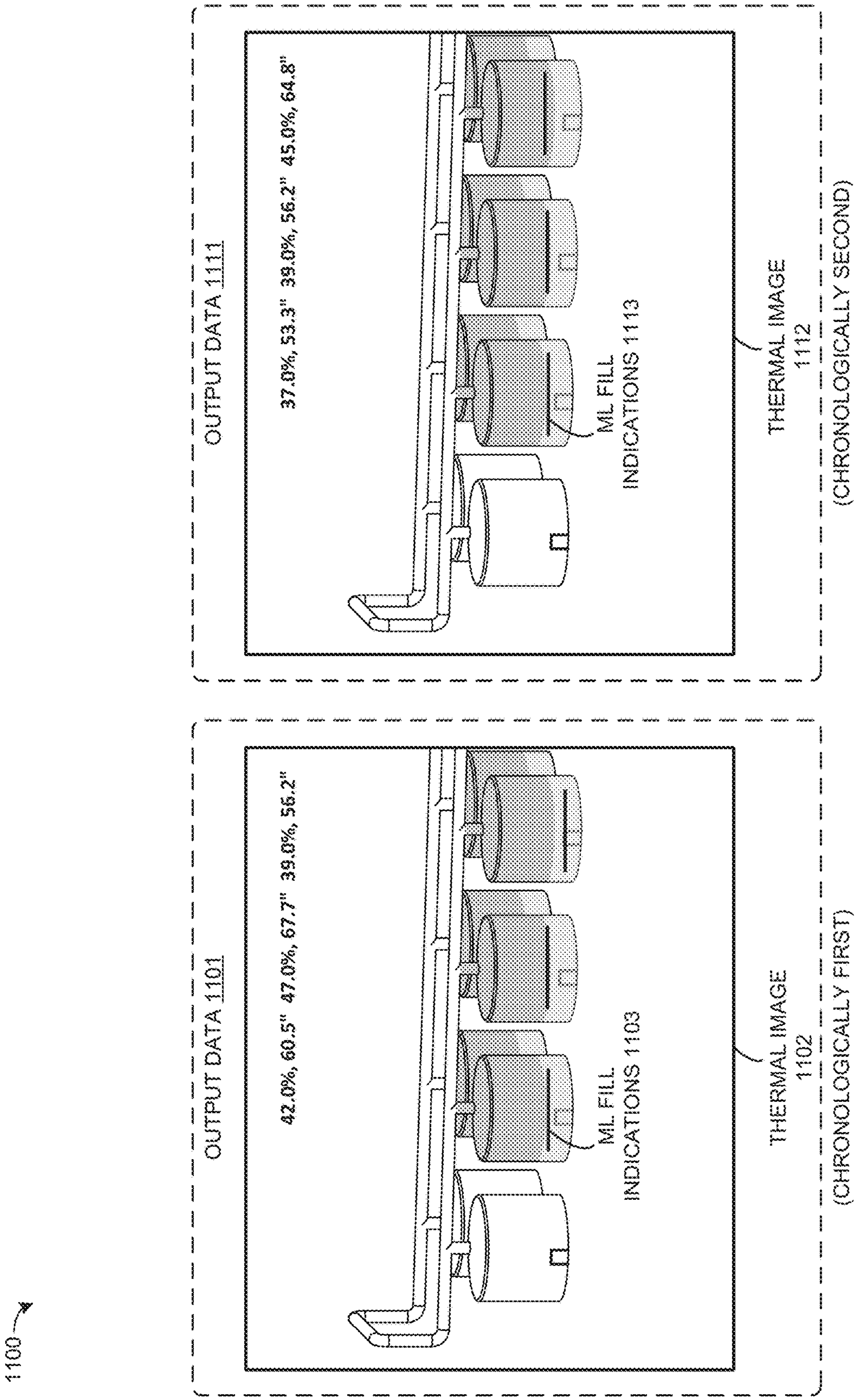
FIG. 11 illustrates exemplary machine learning outputs.

FIG. 11 illustrates environment 1100. Environment 1100 comprises output data 1101 and 1111. Output data 1101 and 1111 are representative of a machine learning outputs from two chronological periods. Output data 1101 comprises thermal images 1101 which depicts the thermal profile of fuel storage tanks at a chronologically first time period and output data 1102 comprises thermal images 1112 which depicts the thermal profile of the fuel storage tanks at a chronologically second time period. A machine learning model generates output data 1101 and 1111 based on input images. The machine learning model marks the portions of thermal image 1102 that depict the fill level of the fuel vessels as machine learning fill indication 1103. The machine learning model marks the portions of thermal image 1112 that depict the fill level of the fuel vessels as machine learning fill indication 1113. The machine learning model calculates the fill height and fill percentage for each of the tanks to show how tank fuel levels change over time. Output data 1101 and 1111 may be provided to tank control systems (e.g., user computer 531 or tank fill controller 614) to raise, lower, or maintain the fuel level in the tanks.

Figure 12:
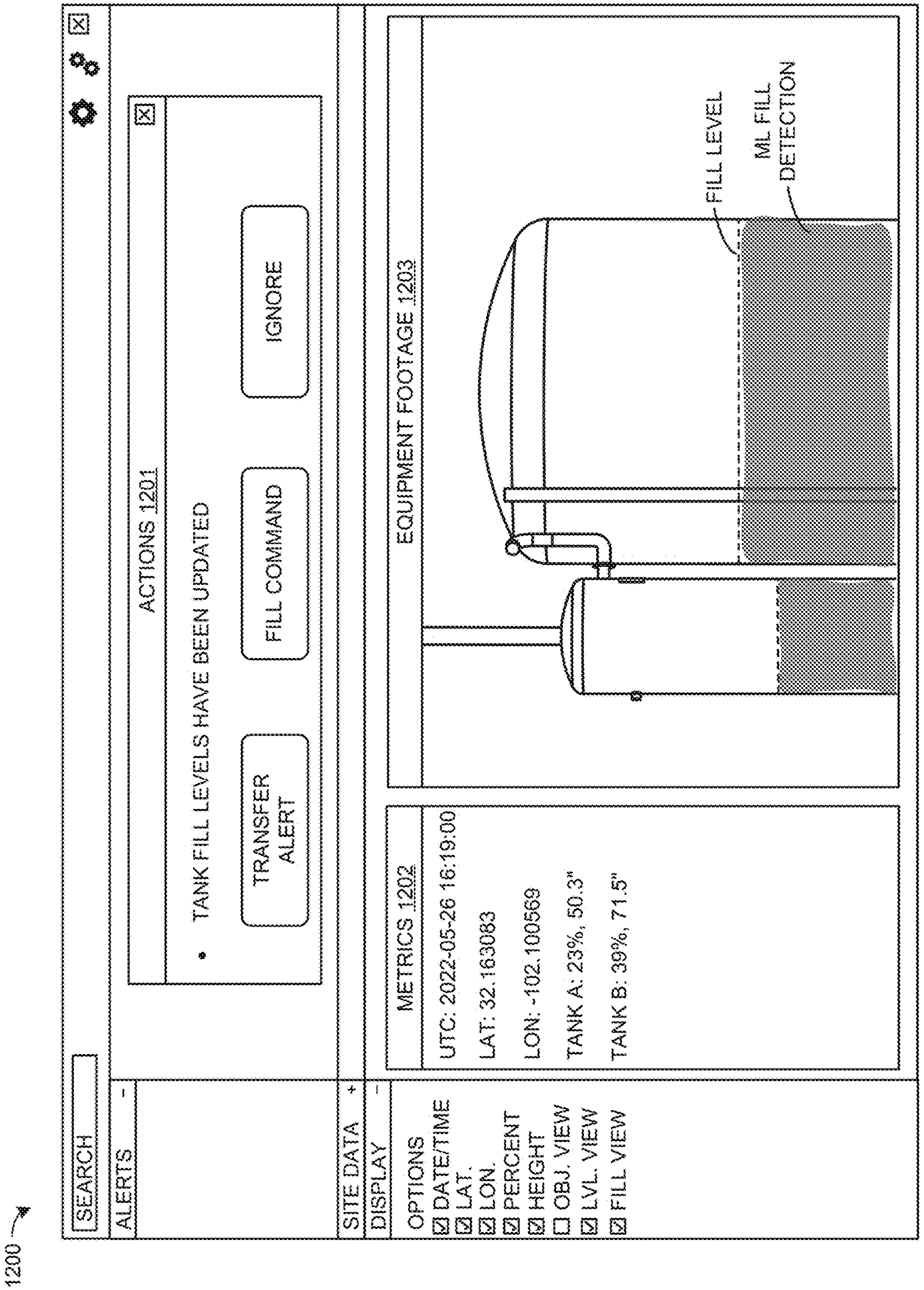
FIG. 12 illustrates an exemplary user interface.

FIG. 12 illustrates user interface 1200. User interface 1200 is an example of application 122 illustrated in FIG. 1 and GUI 532 illustrated in FIG. 5, however application 132 and GUI 532 may differ. User interface 1200 comprises actions 1201, metrics 1202, and equipment footage 1203. Actions 1201 comprises a notification indicating tank fill levels have been updated. For example, the computing device that renders user interface 1200 may receive an output generated by a machine learning model trained to detect storage vessel fill levels and responsively display actions 1201. Actions 1201 comprises selectable options to transfer an alert, to transfer a fill command, or to ignore the notification. Metrics 1202 comprise information like date/time, latitude and longitude coordinates, equipment IDs, vessel fill height, and vessel fill percentage. Equipment footage 1203 comprises an infrared image depicting the fill levels of fuel vessels. Equipment footage 1203 is marked with annotations from the machine learning model to identify the detected fill level. User interface 1200 comprises a set of selectable options on the left-side panel that allows a user to customize the view of equipment footage 1203 and the information presented in metrics 1202.

Figure 13:
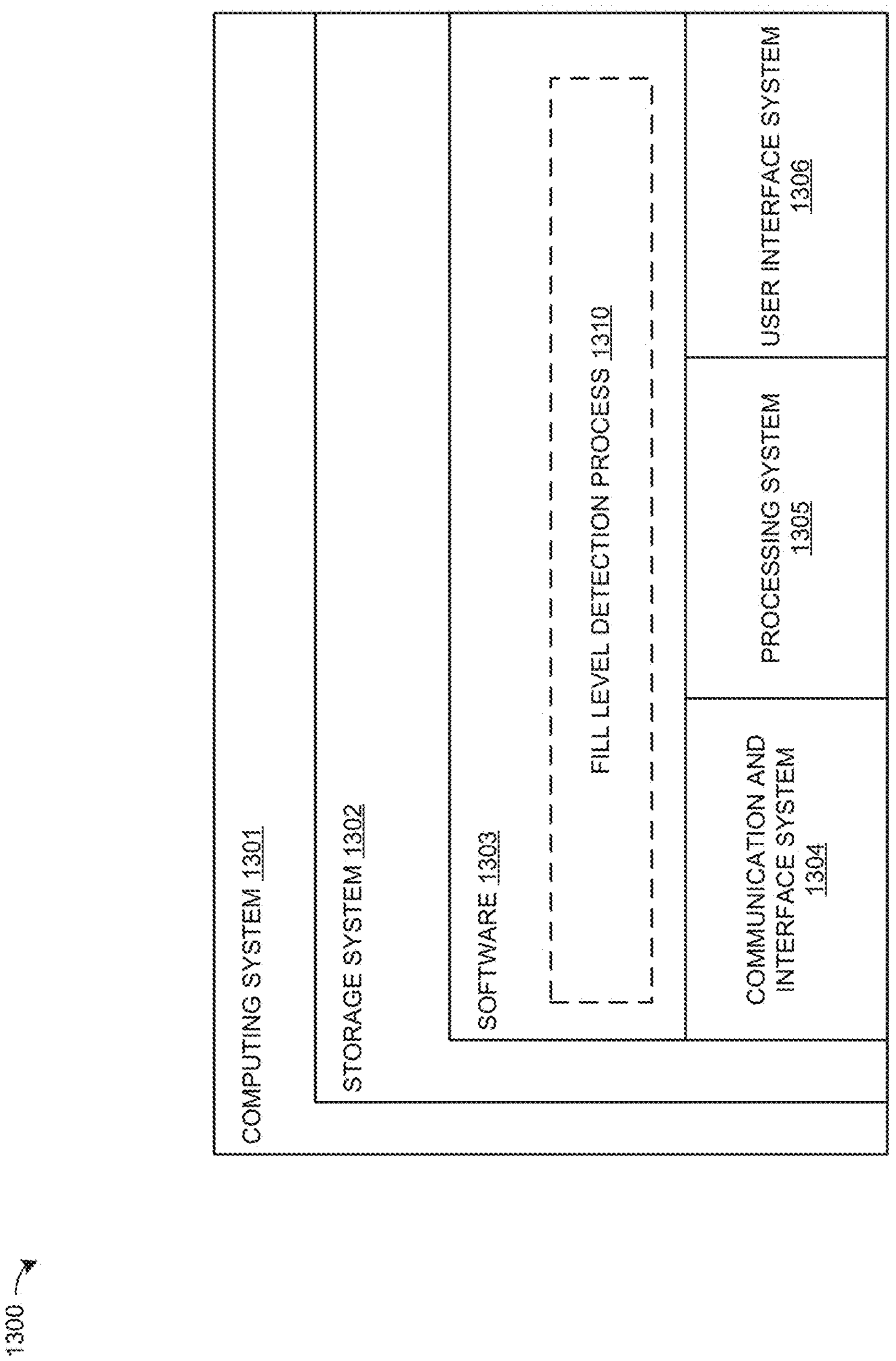
FIG. 13 illustrates an exemplary computing system.

FIG. 13 illustrates computing environment 1300 according to an implementation of the present technology. Computing environment 1300 comprises computing system 1301. Computing system 1301 is representative of any system or collection of systems with which the various operational architectures, processes, scenarios, and sequences disclosed herein for detecting fill levels in fuel storage and transfer equipment. For example, computing system 1301 may be representative of camera 111, model computer 121, user computer 131, cloud services 141, thermal imaging device 521, machine learning interface 522, machine learning engine 524, user computer 531, and/or any other computing device contemplated herein. Computing system 1301 may be implemented as a single apparatus, system, or device or may be implemented in a distributed manner as multiple apparatuses, systems, or devices. Computing system 1301 includes, but is not limited to, storage system 1302, software 1303, communication interface system 1304, processing system 1305, and user interface system 1306. Processing system 1305 is operatively coupled with storage system 1302, communication interface system 1304, and user interface system 1306.

Processing system 1305 loads and executes software 1303 from storage system 1302. Software 1303 includes and implements fill level detection process 1310, which is representative of any of the fill level detection processes described with respect to the preceding Figures, including but not limited to the thermal imaging, machine learning, fill level detection and classification, and user interface operations described with respect to the preceding Figures. For example, fill level detection process 1310 may be representative of process 300 illustrated in FIG. 3, process 400 illustrated in FIG. 4, and/or process 700 illustrated in FIG. 7. When executed by processing system 1305 to measure fill levels in fuel storage equipment, software 1303 directs processing system 1305 to operate as described herein for at least the various processes, operational scenarios, and sequences discussed in the foregoing implementations. Computing system 1301 may optionally include additional devices, features, or functionality not discussed for purposes of brevity.

Processing system 1305 may comprise a micro-processor and other circuitry that retrieves and executes software 1303 from storage system 1302. Processing system 1305 may be implemented within a single processing device but may also be distributed across multiple processing devices or sub-systems that cooperate in executing program instructions. Examples of processing system 1305 include general purpose CPUs, GPUs, DSPs, ASICs, FPGAs, analog computing devices, and logic devices, as well as any other type of processing device, combinations, or variations thereof.

Storage system 1302 may comprise any computer readable storage media readable by processing system 1305 and capable of storing software 1303. Storage system 1302 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1302 may also include computer readable communication media over which at least some of software 1303 may be communicated internally or externally. Storage system 1302 may be implemented as a single storage device but may also be implemented across multiple storage devices or sub-systems co-located or distributed relative to each other. Storage system 1302 may comprise additional elements, such as a controller, capable of communicating with processing system 1305 or possibly other systems.

Software 1303 (including fill level detection process 1310) may be implemented in program instructions and among other functions may, when executed by processing system 1305, direct processing system 1305 to operate as described with respect to the various operational scenarios, sequences, and processes illustrated herein. For example, software 1303 may include program instructions for generating feature vectors that represent a thermal image depicting a petroleum storage vessel and generating a machine learning output to identify and classify the fill level of the petroleum storage vessel as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1303 may include additional processes, programs, or components, such as operating system software, virtualization software, or other application software. Software 1303 may also comprise firmware or some other form of machine-readable processing instructions executable by processing system 1305.

In general, software 1303 may, when loaded into processing system 1305 and executed, transform a suitable apparatus, system, or device (of which computing system 1301 is representative) overall from a general-purpose computing system into a special-purpose computing system customized to detect and classify fuel fill levels in infrared videos using machine learning algorithms as described herein. Indeed, encoding software 1303 on storage system 1302 may transform the physical structure of storage system 1302. The specific transformation of the physical structure may depend on various factors in different implementations of this description. Examples of such factors may include, but are not limited to, the technology used to implement the storage media of storage system 1302 and whether the computer-storage media are characterized as primary or secondary storage, as well as other factors.

For example, if the computer readable storage media are implemented as semiconductor-based memory, software 1303 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1304 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for fill level detection and classification, it should be understood that the condition systems and methods described herein are not limited to such embodiments and may apply to a variety of other environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method of operating a detection system to determine fill levels in a fuel extraction and storage environment, the method comprising:

generating feature vectors based on a thermal image that depicts a fuel storage equipment;

feeding the feature vectors to a machine learning engine that comprises an object detection machine learning model, a fill level detection machine learning model, a shadow/reflection machine learning model, and a non-linear function machine learning algorithm;

receiving an object detection output from the object detection machine learning model that identifies portions of the thermal image that depict the fuel storage equipment;

receiving a fill level output from the fill level detection machine learning model that identifies portions of the thermal image that depict the fill level for the fuel storage equipment;

receiving a shadow/reflection output from the shadow/reflection machine learning model that identifies portions of the thermal image that depict shadows and/or reflections;

feeding the object detection output, the fill level output, and the shadow/reflection output to the non-linear function machine learning algorithm;

receiving a non-linear function output that indicates a fill percentage and a fill height for the fuel storage equipment; and generating and transferring a notification based on the non-linear function output.

2. The method of claim 1 wherein:

generating the feature vectors comprises generating numerical representations of the thermal image; and feeding the feature vectors to the machine learning system comprises feeding the numerical representations of the thermal image to the machine learning engine.

3. The method of claim 1 wherein feeding the object detection output, the fill level output, and the shadow/reflection output to the non-linear function machine learning algorithm comprises:

determining a fill level pixel height;

determining a total pixel height of the fuel storage equipment;

calculating a ratio of the fill level pixel height and the total pixel height to determine the fill percentage;

applying the fill level percentage to an actual fuel storage equipment volume and an actual fuel storage equipment height to determine an actual fill height, an actual fuel volume, and an actual unfilled volume; and generating the non-linear function output that comprises the thermal image, the fill level indication, the fill percentage, the actual fill height, the actual fuel volume, and the actual unfilled volume of the fuel storage equipment.

4. The method of claim 1 wherein feeding the object detection output, the fill level output, and the shadow/reflection output to the non-linear function machine learning algorithm comprises comparing the portions of the thermal image that depict shadows and/or reflections with the portions of the thermal image that depict the fill level for the fuel storage equipment to screen for false positive outputs.

5. The method of claim 1 further comprising generating the thermal image that depicts a fuel storage equipment.

6. The method of claim 1 wherein the notification comprises a command to fill the fuel storage equipment.

7. The method of claim 1 wherein the notification comprises a command to not fill the fuel storage equipment.

8. A detection system to determine fill levels in a fuel extraction and storage environment, the detection system comprising:

a thermal imaging device configured to generate a thermal image that depicts a fuel storage equipment;

a machine learning interface configured to generate feature vectors based on the thermal image that depicts the fuel storage equipment; and the machine learning engine configured to ingest the feature vectors, wherein the machine learning engine comprises an object detection machine learning model, a fill level detection machine learning model, a shadow/reflection machine learning model, and a non-linear function machine learning algorithm;

the object detection machine learning model configured to generate an object detection output that identifies portions of the thermal image that depict the fuel storage equipment based on the feature vectors;

the fill level detection machine learning model configured to generate a fill level output that identifies portions of the thermal image that depict the fill level for the fuel storage equipment based on the feature vectors;

the shadow/reflection machine learning model configured to generate a shadow/reflection output from that identifies portions of the thermal image that depict shadows and/or reflections based on the feature vectors;

the non-linear function machine learning algorithm configured to determine a fill percentage and a fill height for of the fuel storage equipment based on the object detection output, the fill level output, and the shadow/reflection output;

the machine learning engine configured to generate and transfer a notification based on the non-linear function output.

9. The detection system of claim 8 wherein:

the machine learning interface is to generate numerical representations of the thermal image to create the feature vectors and feed the numerical representations of the thermal image to the machine learning engine.

10. The detection system of claim 8 wherein the non-linear function machine learning algorithm is further configured to:

determine a fill level pixel height;

determine a total pixel height of the fuel storage equipment;

calculate a ratio of the fill level pixel height and the total pixel height to determine the fill percentage;

apply the fill level percentage to an actual fuel storage equipment volume and an actual fuel storage equipment height to determine an actual fill height, an actual fuel volume, and an actual unfilled volume; and generate the non-linear function output that comprises the thermal image, the fill level indication, the fill percentage, the actual fill height, the actual fuel volume, and the actual unfilled volume of the fuel storage equipment.

11. The detection system of claim 8 wherein the non-linear function machine learning algorithm is further configured to compare the portions of the thermal image that depict shadows and/or reflections with the portions of the thermal image that depict the fill level for the fuel storage equipment to screen for false positive outputs.

12. The detection system of claim 8 wherein the thermal imaging device is to film the fuel storage equipment to generate the thermal image.

13. The detection system of claim 8 further comprising a user device to receive the machine learning output and transfer a command to fill the fuel storage equipment based on the machine learning output.

14. The detection system of claim 8 further comprising a user device to receive the machine learning output and transfer a command to not fill the fuel storage equipment based on the machine learning output.

15. A non-transitory computer-readable medium stored thereon program instructions to determine fill levels in a fuel extraction and storage environment, that, in response to execution, cause a system comprising a processor to perform operations, the operations comprising:

generating feature vectors based on a thermal image that depicts a fuel storage equipment;

feeding the feature vectors to a machine learning engine that comprises an object detection machine learning model, a fill level detection machine learning model, a shadow/reflection machine learning model, and a non-linear function machine learning algorithm;

receiving an object detection output from the object detection machine learning model that identifies portions of the thermal image that depict the fuel storage equipment;

receiving a fill level output from the fill level detection machine learning model that identifies portions of the thermal image that depict the fill level for the fuel storage equipment;

receiving a shadow/reflection output from the shadow/reflection machine learning model that identifies portions of the thermal image that depict shadows and/or reflections;

feeding the object detection output, the fill level output, and the shadow/reflection output to the non-linear function machine learning algorithm;

receiving a non-linear function output that indicates a fill percentage and a fill height for the fuel storage equipment; and generating and transferring a notification based on the non-linear function output.

16. The non-transitory computer readable medium of claim 15 wherein:

generating the feature vectors comprises generating numerical representations of the thermal image; and feeding the feature vectors to the machine learning system comprises feeding the numerical representations of the thermal image to the machine learning engine.

17. The non-transitory computer readable medium of claim 15 wherein feeding the object detection output, the fill level output, and the shadow/reflection output to the non-linear function machine learning algorithm comprises:

determining a fill level pixel height;

determining a total pixel height of the fuel storage equipment;

calculating a ratio of the fill level pixel height and the total pixel height to determine the fill percentage;

applying the fill level percentage to an actual fuel storage equipment volume and an actual fuel storage equipment height to determine an actual fill height, an actual fuel volume, and an actual unfilled volume; and generating the non-linear function output that comprises the thermal image, the fill level indication, the fill percentage, the actual fill height, the actual fuel volume, and the actual unfilled volume of the fuel storage equipment.

18. The non-transitory computer readable medium of claim 15 wherein feeding the object detection output, the fill level output, and the shadow/reflection output to the non-linear function machine learning algorithm comprises comparing the portions of the thermal image that depict shadows and/or reflections with the portions of the thermal image that depict the fill level for the fuel storage equipment to screen for false positive outputs.

19. The non-transitory computer readable medium of claim 15 wherein the notification comprises a command to fill the fuel storage equipment.

20. The non-transitory computer readable medium of claim 15 wherein the notification comprises a command to not fill the fuel storage equipment.

* * * * *